United States Patent [19]
Corrigan et al.

[11] 3,907,681
[45] Sept. 23, 1975

[54] FILTER SYSTEM AND METHOD

[75] Inventors: John E. Corrigan, Evanston; Henry J. Dokter, Lansing; Ambrose Ethington, Country Club Hills, all of Ill.

[73] Assignee: F. W. Means & Company, Chicago, Ill.

[22] Filed: Nov. 12, 1973

[21] Appl. No.: 414,735

[52] U.S. Cl. .................. 210/75; 210/81; 210/108; 210/193; 210/332; 210/409
[51] Int. Cl.² .................. B01D 37/02; B01D 23/24
[58] Field of Search ............ 210/73, 75, 80, 81, 82, 210/108, 138, 167, 332, 333, 340, 341, 79, 409, 415, 433, 193

[56] References Cited
UNITED STATES PATENTS

| | | | |
|---|---|---|---|
| 582,403 | 5/1897 | Stifel | 210/409 X |
| 872,437 | 12/1907 | Leonard | 210/409 |
| 2,423,172 | 7/1947 | Booth | 210/82 |
| 2,538,575 | 1/1951 | Kracklaver | 210/409 X |
| 2,658,623 | 11/1953 | Thornhill | 210/409 |
| 2,862,622 | 12/1958 | Kircher, Jr. et al. | 210/82 X |
| 2,884,132 | 4/1959 | Kangas | 210/108 X |
| 3,168,469 | 2/1965 | Abdalian et al. | 210/75 X |
| 3,280,978 | 10/1966 | Scott | 210/81 X |
| 3,441,503 | 4/1969 | Smith | 210/82 X |
| 3,497,452 | 2/1970 | Arvanitakis | 210/73 X |
| 3,520,805 | 7/1970 | Ryan | 210/73 X |
| 3,532,220 | 10/1970 | Lewis | 210/409 X |
| 3,705,648 | 12/1972 | Arvanitakis | 210/73 X |
| 3,744,633 | 7/1973 | Schmidt, Jr. et al. | 210/82 |
| R25,761 | 4/1965 | Hirs | 210/108 |

*Primary Examiner*—Samih N. Zaharna
*Assistant Examiner*—Robert H. Spitzer
*Attorney, Agent, or Firm*—Molinare, Allegretti, Newitt & Witcoff

[57] ABSTRACT

In a system for continuously filtering a fluid, such as a cleaning fluid, including a method and system for regenerating the filters comprising a plurality of parallel filter cells each having a prefilt inlet, a filtrate discharge outlet, a fill liquid inlet, a dump valve which dumps to a desludging apparatus having a movable conveyor screen for separating the solids from the desludged liquids, and precoat supply and return conduits communicating with each of cells. The cells are regenerated, one at a time, while the remaining cells continue to filter in parallel. Upon regeneration, the filtrate discharge conduit is shut and the dump valve is opened simultaneously, thereby immediately changing the flow pattern of the incoming liquid to flush the contaminants and filter aid from the filters and discharge these materials to the desludger through the dump valve without allowing the solids to settle in the filter cells. The pressure across the filter is immediately equalized and, in some instances, the filtrate side is slightly pressurized when regeneration is initiated by the simultaneous operation of the valves and by bleeding a small amount of air to the filtrate side of the filter.

29 Claims, 16 Drawing Figures

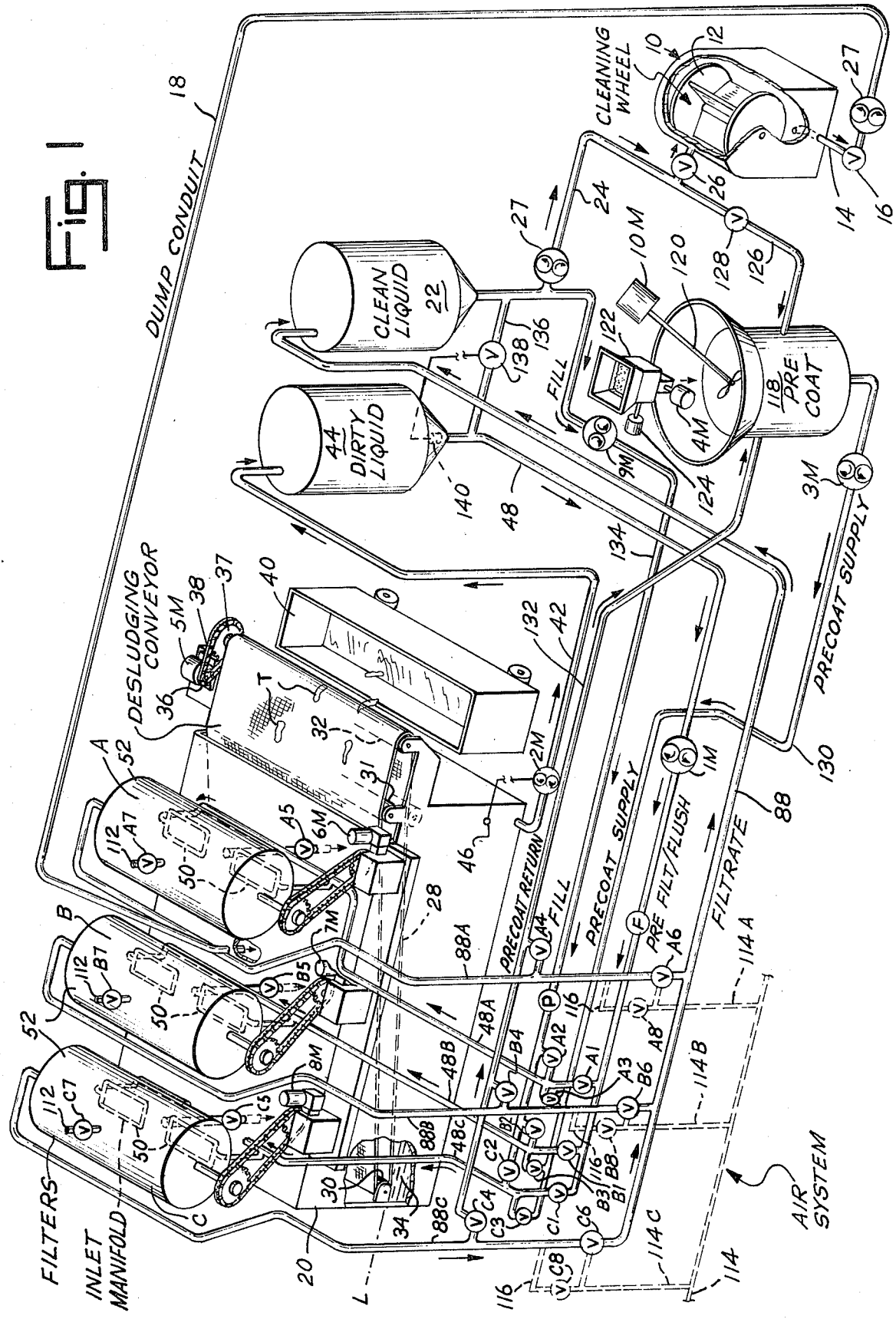

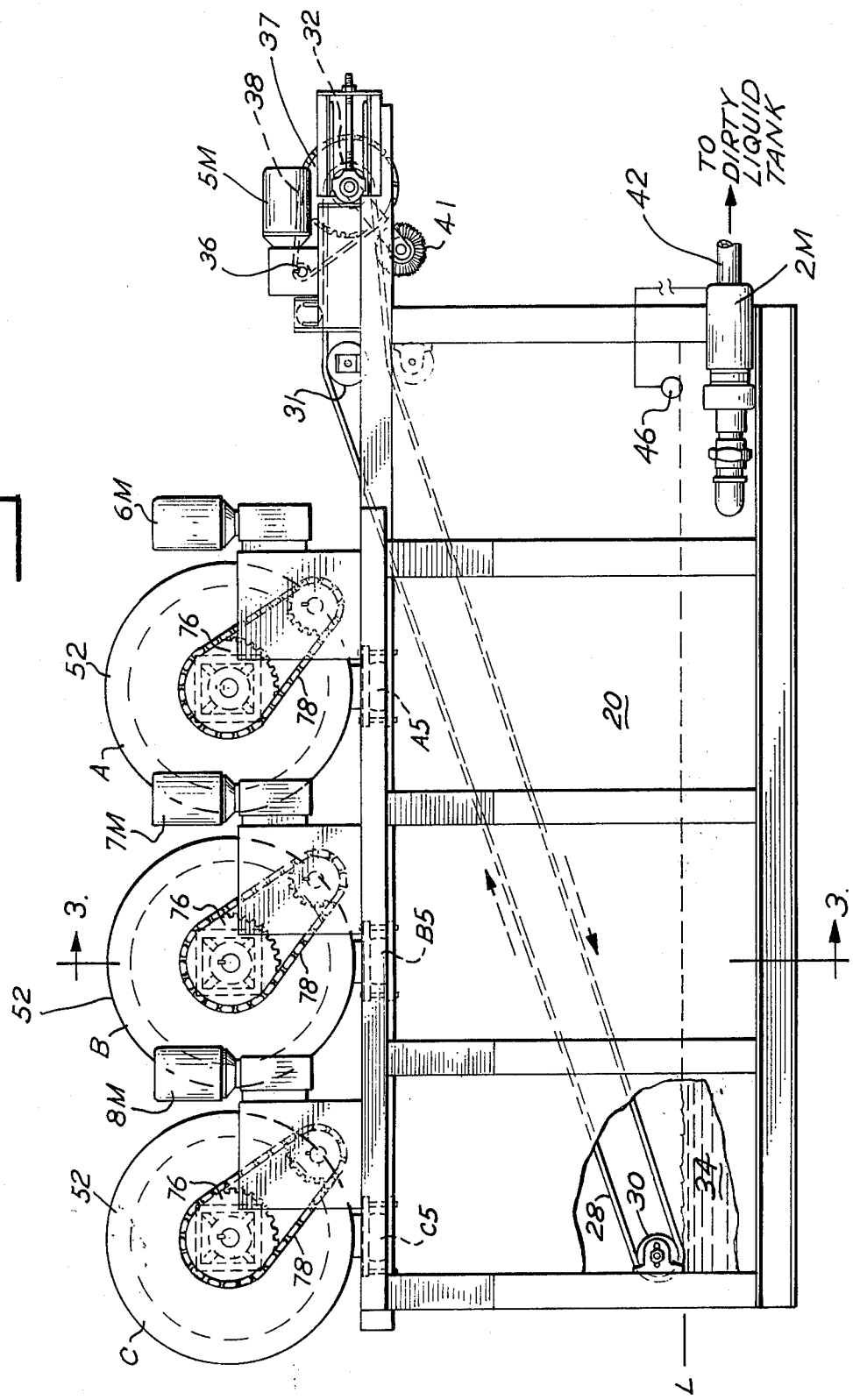

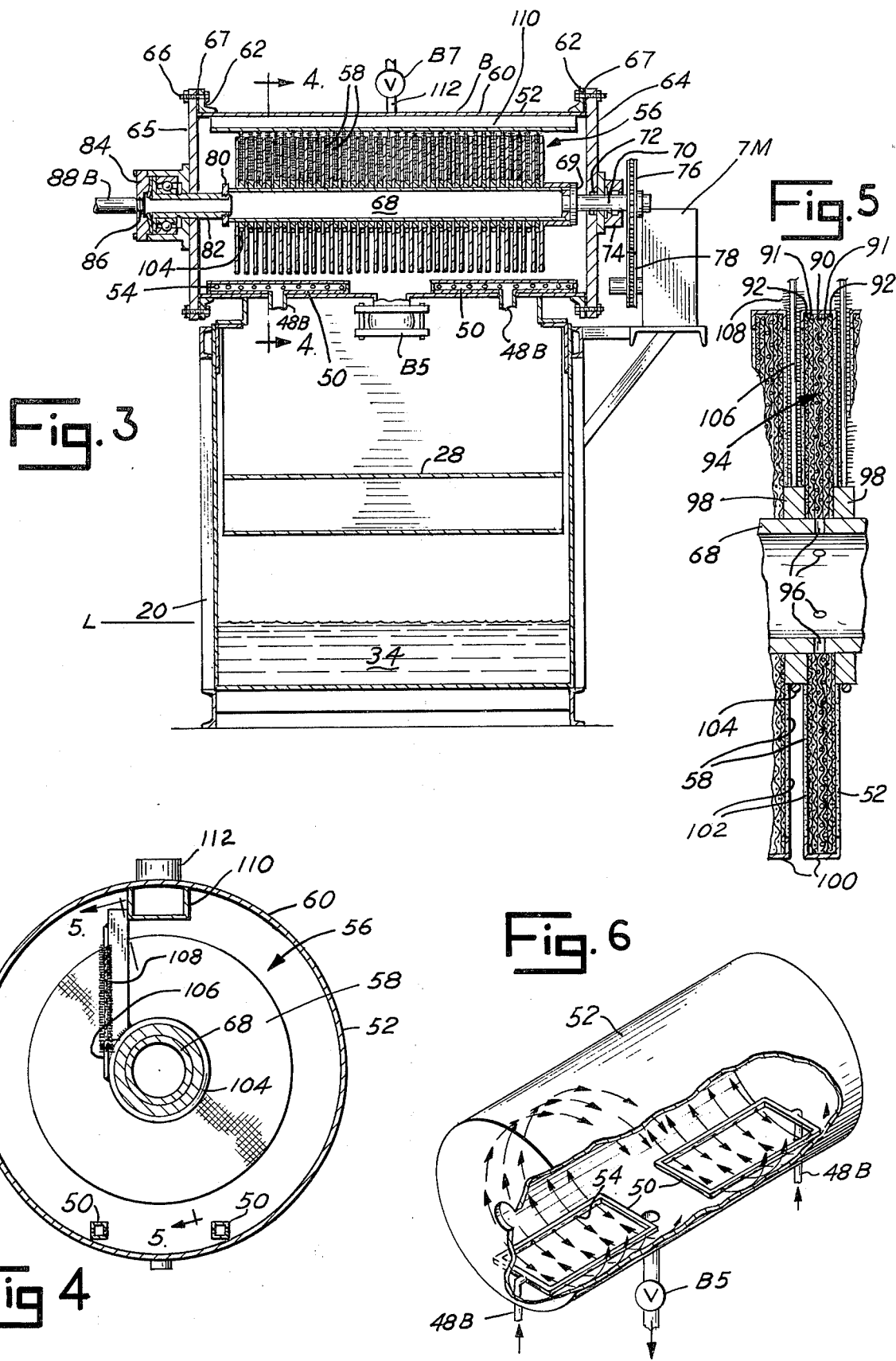

Fig. 16

FILTER SYSTEM AND METHOD

BACKGROUND AND SUMMARY OF THE INVENTION

This invention relates to a filter system and method and, more particularly, to an improved filter and filter regeneration system and method for use in cleaning and other filtration systems.

Cleaning systems, whether commercial systems or coin operated dry cleaning or other cleaning systems, require at least periodic cleaning of the cleaning fluid to remove dirt, lint, and other contaminants. Such cleaning of fluid is frequently accomplished by on site filtration. The filter systems usually take one of several forms. In several filter systems filtration commences only one after one or several loads of articles have been cleaned. In these systems, the cleaning fluid is removed from the cleaning receptacle and then passed through one or more filters and is then reintroduced to the receptacle. Such systems generally necessitate that the cleaning wheel be placed out of commission during filtration, and the entire system is placed out of operation when it is necessary to repair or to regenerate the filters themselves. In other filter systems, filtration and regeneration are carried out independently of cleaning wheel operation. These systems have the advantage of allowing substantially continuous operation of the cleaning wheel, whether or not the liquid is being filtered or the filters are being regenerated.

The present invention relates to the latter form of system. The filters in such independent systems generally are of the type which employ a particulate filter medium or precoat, such as diatomaceous earth, which is coated upon a foraminous support assembly and wherein the liquid to be filtered passes through the layer or precoat which removes and retains the contaminants. To regenerate such precoat filters, one or more of several different methods have been employed in the past. The precoat, along with the contaminants which have been retained thereon, may be backflushed from the foraminous support assembly by introducing a liquid or gas in a direction counter to the direction in which the liquid normally flows during filtration. One of the disadvantages of backflushing is that the foraminous support assembly frequently comprises a thin screen or mesh which is supported against the substantial fluid forces during normal filtration, but which is generally not constructed to withstand the substantial forces exerted in the opposite direction such as are present during backflushing. Thus, backflushing frequently results in damage to the foraminous support meshes and requires frequent replacement of these meshes and down time. In addition, short circuiting and incomplete cleaning of the filters occasionally occurs due to partial removal of a portion of the dirty precoat which allows the backflushing liquid to bypass the remaining caked precoat.

Another method of cleaning such filters which avoids the last mentioned problem, is flushing the filters with fluid from the prefilt side of the filters. This flushing may be accompanied by mechanical cleaning, such as by scrapers or brushes, which are positioned between the filter leaves and either the filter leaves are rotated relative to the brushes or vice versa. The latter combination of flushing and mechanical cleaning has been popular, since it avoids the problem encountered in backflushing, but suffers another important disadvantage. The contaminated precoat generally presents a substantial barrier to rapid pressure equalization across the filter medium between the prefilt and filtrate sides of the filter once the filter has been secured in preparation for regeneration. This is particularly the case when it is considered that the need for regeneration results from the fact that fluid flow through the filter has reached a minimum and pressure build up on the prefilt side of the filter a maximum due to collection of contaminants on the filter. If mechanical cleaning or even flushing is commenced while a substantial pressure drop will exist across the filter, it has been found that the fine foraminous support mesh becomes clogged after only a few regeneration cycles and the entire filter cell must be disassembled and the support mesh replaced. This is because particles of contaminated filter aid are actually driven into the fine mesh due to the pressure differential between the prefilt and filtrate sides of the filter. For this reason virtually all filter regeneration systems of the type comprising the subject matter of the present invention have found it necessary to provide a substantial time lapse between shutdown of the filter and the commencement of regeneration to allow for pressure euqalization to avoid this clogging problem. Moreover, in some cleaning systems, an oil is utilized as the cleaning fluid. Such oils are petroleum base oils which are also impregnated in the final cleaned articles, such as dust attracting oils. In such oil systems the filter aid tends fo firmly cake and if precoating is commenced before the contaminated precoat has been fully removed from the mesh, excessive build up of precoat will quickly occur and the filter leaves will become inoperative.

The system and method of the present invention overcome these difficulties. In the present invention regeneration of the filter may be commenced simultaneously upon shutdown of the filter and without clogging of the filter elements or support mesh. In the system and method of the present invention rapid and immediate equalization of pressure across the filter, and in the caking of the precoat a slightly positive pressure on the filtrate side of the filter, may be realized by one or more steps, including the simultaneous dumping of the prefilt and shutting of the filtrate discharge and the introduction of a fluid, under minimal pressure, to the filtrate side of the filter upon filter shutdown to insure complete contaminated precoat removal. In the system and method of the present invention, regeneration and filtration are independent of the operation of an article cleaning portion of the system and regeneration and filtration may be carried out simultaneously. In the system and method of the present invention filtration may be continuous and even continues during regeneration of the filters. In the present invention, contaminated liquid discharged from the filters during regeneration may be reclaimed and returned to the system with only minimal loss, this being particularly important where the cleaning liquid is a relatively expensive solvent, such as perchloroethylene. The system and method of the present invention may be completely automated and the filters need only be regenerated automatically when necessary. Finally, in the system and method of the present invention, circulation is produced which prevents settling out of precoat or contaminants which might otherwise require frequent cell shutdown for cleaning.

In a method incorporating the principles of the present invention, the filtrate discharge of filter means is closed and the prefilt surrounding the filter means is simultaneously dumped while a flushing fluid is directed against the prefilt side of the filter means while dumping the prefilt.

In such method, wherein the filter medium is a particulate filter medium coated upon a foraminous support assembly, the particulate filter medium may also be flushed from the filter means along with any contaminants and dumped from the filter means.

In a system incorporating the principles of the present invention, a fluid filter regeneration system includes a fluid enclosure having filter means therein and prefilt inlet means and filtrate discharge means communicating with the prefilt and filtrate sides of the filter means. Flushing means is provided for directing a flushing liquid against the prefilt side of the filter means and dump means discharged fluid from the prefilt side of the filter means. The improvement in such system comprises, in combination therewith, valve means on the filtrate discharge means, dump means and flushing means, and control means which controls the respective valve means such that the filtrate discharge means is closed and the dump means and flushing means are opened simultaneously, whereby the pressure across the filter means is rapidly equalized.

These and other objects, features and advantages of the present invention will be more clearly understood through a consideration of the following detailed description:

BRIEF DESCRIPTION OF THE DRAWINGS

In the course of this description, reference will frequently be made to the attached drawings in which:

FIG. 1 is an overall perspective schematic view of the cleaning system and filter regeneration system of the present invention, which system employs the method of the present invention;

FIG. 2 is a front elevation view of the filter cells and desludger of the system and method of the present invention;

FIG. 3 is a cross sectioned end elevation view of one of the filter cells and the desludger, taken substantially along line 3—3 of FIG. 2;

FIG. 4 is a cross sectional elevation view of one of the filter cells of the present invention, taken substantially along line 4—4 of FIG. 3;

FIG. 5 is an enlarged cross sectioned view of one of the filter leaves of the filter, taken substantially along line 5—5 of FIG. 4;

FIG. 6 is a schematic perspective view of the tank or enclosure of one of the filter cells, which is partially broken away to show the liquid circulation therein during flushing;

FIG. 16 is a chart showing the sequence of operation of the system and method of the present invention during startup, recycle and shutdown.

DESCRIPTION OF THE PREFERRED EMBODIMENT

Figure 7:
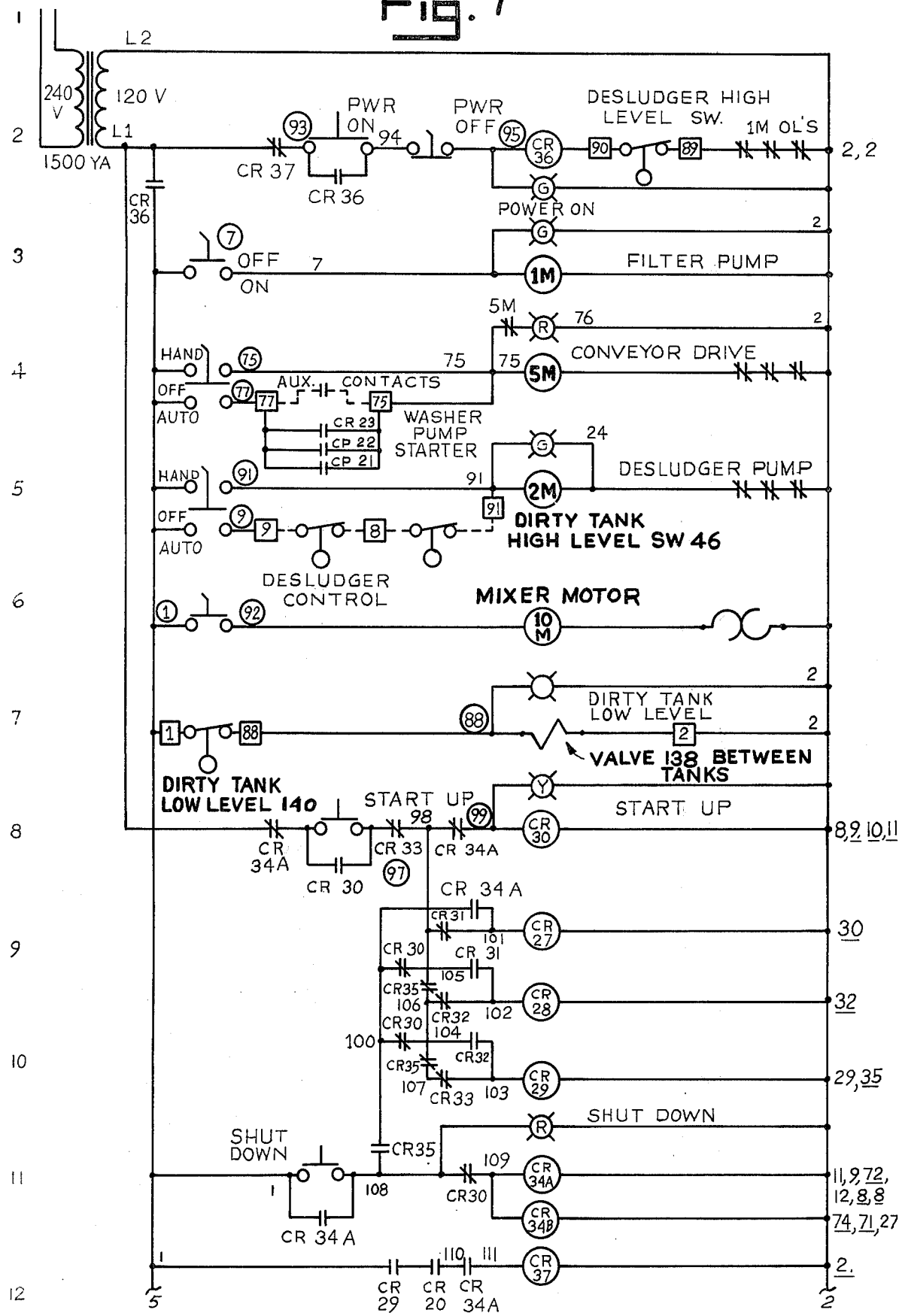
FIGS. 7–14 show a suitable electrical control circuit for controlling the operation of the filter cells and regeneration thereof according to the method of the present invention.

In FIG. 1, an overall schematic view is shown of a preferred embodiment of filter system constructed in accordance with the principles of the present invention and which employs the method of the present invention and in which the filter system is employed to clean the cleaning liquid of an article cleaning system. The system includes a cleaning wheel 10 in which articles are cleaned by a suitable fluid, e.g. water, cleaning oil, perchloroethylene, etc. The cleaning wheel 10 is of conventional construction and includes a rotative member 12 for agitating the articles being cleaned. A conduit 14 having a valve 16 therein, is provided at the bottom of the cleaning wheel 10 for draining the contaminated cleaning liquid from the wheel and dumping the liquid through a dump conduit 18 to a desludger tank 20. Valve 16 may either be manually operated or controlled by a timer or other sophisticated programmed device as is common in the cleaning art. A clean liquid tank 22 is provided for storage of fresh filtered cleaning liquid and a conduit 24 having a valve 26, communicates the clean liquid tank with the cleaning wheel 10 for refilling the wheel once it has been drained of the dirty liquid. Pumps 27 may be provided in one or both of conduits 18 and 24.

The desludger tank 20 has an inclined screen conveyor 28 mounted therein on suitable rollers 30, 31 and 32. A plurality of filter cells A, B and C are mounted on top of the desludger tank 20 and dump valves A5, B5 and C5 from the respective filter cells A, B and C, are positioned to discharge in the desludger tank and onto the conveyor screen 28 as does the dump conduit 18 from the cleaning wheel 10. Thereby, the contaminated liquid from the cleaning wheel is initially desludged prior to treatment by the filter cells. This liquid is discharged upon the conveyor screen 28 which retains the large contaminants, such as lint and other larger debris and the liquid, after passing through the screen, is collected in the sump 34 of the desludger tank 20.

A drive motor 5M drives roll 32 of the conveyor screen 28 by way of suitable sprockets 36 and 37 and drive chain 38, such that the screen 28 is driven in a clockwise direction as viewed in FIG. 1 to convey the retained solid contaminants T upward and out of the tank where they are discharged to a trash vessel 40. As shown in FIG. 2, a suitable cleaning brush 41 may also be provided to insure complete removal of the trash from the screen.

A desludger reaches conduit 42, being a desludger pump 2M, draws liquid from the sump 34 of the desludger tank 20 and discharges the liquid to a dirty liquid storate tank 44. The pump 2M preferably only operates when the liquid in sump 34 reaches predetermined maximum level L below the lowest portion of screen conveyor 20. Accordingly, energization of the pump 2M is controlled by suitable level control means, e.g. a float 46.

The liquid in the dry liquid tank 44 is the prefilt which is to be treated int the filter cells A, B and C. A prefilt conduit 48 extends between the dirty liquid tank 44 and communicates each of the filter cells A, B and C by way of prefilt inlet conduits 48A, 48B and 48C. Prefilt conduit 48 includes a circulating pump 1M for pumping prefilt from the dirty liquid tank 44 to the filter cells. Valves A1, B1 and C1 are located in each of the prefilt conduits 48A, 48B and 48C, respectively, and these conduits discharge to a pair of rectangular inlet manifolds 50 positioned in the bottom of the liquid tanks 52 surrounding the filters in cells A, B and C.

Discharge apertures 54 are positioned along the length of the rectangular manifolds 50 such that the incoming liquid is discharged into the bottom of the tank from where it flows upward toward the filter 56 and its filter leaves 58 in each of the cells due to the pressure differential across the cells during filtration and will flow in the generally spiral path as shown in FIG. 6 during flushing as shown in FIG. 6 and as will be explained in further detail later. In either event, by positioning the inlet manifolds 50 in the bottom of the tanks 52, agitation of the liquid in the tanks is insured to prevent the settling out of contaminants or precoat. Not only is this important during filtration, but this is particularly important during flushing and precoating of the filter leaves.

Referring particularly in FIGS. 3, 4 and 5, each of the cell enclosures or tanks 52 comprises a generally cylindrical elongate shell 60 having circular flanges 62 at both ends. The ends of the tank shell 60 are closed by head plates 64 and 65 which are bolted to the flanges 62 by bolts 66. Suitable sealing gaskets 67 may be provided between the head plates 64 and 65 and flanges 62 to define a liquid tight housing or enclosure which is able to withstand the maximum prefilt pressures which occur just before regeneration is initiated.

An elongate filtrate collecting manifold 68 extends axially through the tank 52. The filtrate collecting manifold 68 comprises a pipe, one end of which is sealed by a closure plate 69 and a drive shaft 70 is mounted to the closure plate 69 and extends through an opening 72 in head plate 64. The shaft 70 is sealed at opening 72 by a suitable seal (not shown) and extends through a bearing assembly 74 mounted to the exterior of head plate 64. A sprocket 76 is fixed to the end of drive shaft 70 and drive motors 6M, 7M and 8M are mounted on the desludger tank 20. Each of these motors 6M, 7M and 8M is connected in driving relationship to the sprockets 76 by way of drive chains thereby driving the respective sprockets 76, drive shafts 70, filtrate collection manifolds 68 and filter assemblies 56 of cells A, B and C, respectively.

Referring particularly to FIG. 3, the other end of the filtrate collection manifold 66 is also closed by an end plate 80 and a short length of filtrate discharge conduit 82 communicates with the interior of the manifold 68 and extends through a bearing assembly 84 fixed to the exterior of head plate 65. The short conduit 82 rotates with the manifold 68 and acts as an idler shaft during rotation of the filter leaves and supports the entire filter assembly 56 both during rotation and at rest. A threaded opening 86 is provided in the housing of the bearing assembly 84 to communicate the manifold 68 and conduit 82 with the cell filtrate discharge conduit 88A, 88B or 88C.

A plurality of the filter leaves 58 are spaced along the filtrate collecting manifold 68 as shown in FIG. 5. Each of the filter leaves 58 comprises a plurality of circular foraminous discs, preferably wire mesh, which are positioned in sandwiched relationship to each other. Specifically, each of the filter leaves comprises a center, relatively coarse wire mesh 90, for example 6 × 6 stainless steel mesh. This coarse mesh is covered on each side by a finer wire mesh 91, for example 30 × 30 stainless steel wire mesh. Finally, discs 91 are covered by a still finer wire mesh 92 which may be 80 × 80 stainless steel wire mesh where the cleaning liquid is oil and 200 × 200 stainless steel wire mesh where the cleaning liquid is perchloroethylene. It will be understood that the aforementioned mesh sizes and materials are given by way of example only and will vary depending upon the nature of the liquids being cleaned and the size of the precoat particles. In general it is preferred that the largest mesh size which will support a given precoat particle be used, since the larger the mesh size, the stronger the mesh. These discs 90, 91 and 92 together define a foraminous support assembly shown generally as 94 in FIG. 5. Each of these foraminous support assemblies 94 are positioned over filtrate discharge apertures 96 arranged in spaced circular rings along the length of the manifold 68, such that the liquid which passes through each of the filter leaves is discharged into and collected in the interior of the filtrate manifold 68.

Positioning of the respective filter leaves 58 is preferably accomplished by way of a plurality of circular washers 98 fitted over the filtrate manifold 66 and pressed firmly into contact with the mesh layers adjacent the manifolds as shown in FIG. 5. These washers 98 may either be fixed to the manifold or preferably the entire stack of alternating washers and assemblies 94 may be pressed together at the ends of the manifold in order to hold the respective mesh discs 90, 91 and 92 together and position each of these assemblies over the filtrate discharge apertures 96. The outer perimeter of the discs 90, 91 and 92 in the respective foraminous support assemblies 94 are held together by a clamping ring 100 which fits over the respective layers of mesh.

The filters employed in the present invention are preferably of the type in which a particulate filtering medium, known as filter aid or precoat, such as diatomaceous earth, is coated upon the exterior of each of the filter leaves. As such, the principal filtering of the liquid is accomplished by the precoat and the wire mesh layers 90, 91 and 92 are sized simply to provide a foraminous support upon which the filter aid is deposited and supported. The coating of precoat 102 is shown in FIG. 5.

A circular loop 104 is positioned between adjacent filter leaves and the loop encircles washers 98 and includes an elongate extension 106 which projects for a length greater than the width of the filter leaves between the filtrate manifold 68 and the leaves' peripheries. The extension 106 is covered with cleaning bristles 108 which extend into contact with the adjacent faces of adjacent filter leaves as shown in FIGS. 3 and 4. A longitudinal brush stop 110 extends the length of the filter assembly 56 and is positioned such that when the filter assembly is rotated by one of the motors 6M, 7M or 8M, the brushes will rotate into contact with the brush stop as shown in FIG. 4 at which point the brushes are held stationary as the filter leaves continue to rotate.

The brush stop 110 is formed by a U-shaped channel member which is open at both ends. A short vent conduit 112 having an automatic air vent valve A7, B7 or C7 therein extends from the channel member for venting the tanks 52 of the respective filter cells A, B and C. Thereby, the brush stop assembly not only functions to hold the brushes stationary but provides a baffle structure to prevent the escape of liquid during venting of the tanks 52. The air vent valves A7, B7 and C7 are of conventional construction and therefore will not be described in detail herein. Generally, these valves employ a liquid receiving chamber with a float valve therein and communicate with the tanks 52 of each of the cells. So long as the cells are not filled with liquid, the receiving chambers of the respective valves A7, B7 and C7 will not contain liquid and will act to vent their respective cells. However, once the cells fill with liquid, this liquid will fill the chambers of valves A7, B7 and C7 and these valves will shut.

Referring again to FIG. 1, each of the filtrate discharge conduits 88A, 88B and 88C is controlled by a valve A6, B6 and C6 respectively. An air system is provided for injecting low pressure air directly into the respective filtrate discharge conduits 88A, 88B and 88C between the filter cells and valves A6, B6 and C6. The air system includes an air conduit 114 connected to a suitable source of low pressure air (not shown) and branch conduits 114A, 114B, 114C which supply air to solenoid operated valves A8, B8 and C8 and valves A6, B6 and C6, respectively. Additional conduits 116 extend to the filtrate discharge conduits 88A, 88B and 88C from valves A8, B8 or C8 to communicate air to allow a portion of the air at nominal pressure to pass through the filtrate discharge conduits 88A, 88B and 88C to the filtrate side of the filter leaves for rapidly equalizing the pressure across the filter leaves at the commencement of filter cell regeneration. If desired, a suitable orifice or other restriction (not shown) may be included in conduits 116 to control the pressure of the air injected to the filtrate side of the leaves, since this air does not function as a back-flushing fluid, but only as low pressure equalizing air, or cake pressurizing air in the case of oil systems.

In FIG. 1, air conduits 114A, 114B and 114C are shown connected to valves A6, B6 and C6. These connections are representative only and show that valves A6, B6 and C6, as well as the other selectively operated control valves in the system may be air operated valves which are controlled by electrically operated solenoid valves in the air system 114, rather than directly operated by solenoid as described herein.

The filtrate from each of the cells A, B and C is conducted back to the clean liquid tank 22 through filtrate discharge conduit 88. The clean liquid is stored in the clean liquid tank 22 for use in the cleaning wheel 10 as required for replenishment and replacement.

Since the filter cells employed in the present invention are preferably of the precoat type, a precoat system is also provided for replenishing the particulate precoat or filter aid during regeneration. Referring to FIG. 1, the precoat system includes a precoat mixing tank 118 having a suitable mixer 120 driven by motor 10M for mixing the particulate filter medium with liquid in the tank to form a precoat slurry. The precoat powder is supplied in solid form to the tank 118 from a powder storage hopper 122 having a metering motor 4M to meter a predetermined amount of powder to the tank for the preparation of a batch of the precoat slurry during regeneration of each of the cells. A vibrator 124 is associated with the powder hopper 122 to insure that an accurate amount of powder is dispensed each time. A conduit 126 having a valve 128 communicates the clean liquid tank 22 with precoat tank 118 to supply clean makeup liquid for the slurry as is necessary. A precoat supply conduit 130, having a precoat pump 3M, extends from the bottom of the precoat tank 118 and communicates, by way of valves A3, B3 and C3, with the respective prefilt inlet conduit 48A, 48B and 48C between valves A1, B1 and C1 and cells A, B and C.

A precoat return conduit 132 also communicates by way of solenoid operated valves A4, B4 and C4 with the respective filtrate discharge lines 88A, 88B and 88C, between the valves A6, B6 and C6 and the respective cells A, B and C. The precoat return conduit 132 discharges back to the precoat tank 118 and has the purpose of returning the liquid portion of the slurry from the filter leaves during the precoating operation, the particulate precoat from the slurry remaining upon the prefilt side of the filter leaves as the coating layer 102 previously described.

In addition, a fill conduit 134, having a fill circulating pump 9M, extends from the bottom of the clean liquid tank 22 and communicates, through solenoid operated valves A2, B2 and C2, with the respective prefilt inlet conduits 48A, 48B and 48C between the cells A, B and C and valves A1, B1 and C1. The fill conduit 134 is provided for the purpose of initially filling the tanks 52 with clean liquid after the flushing and draining cycles during regeneration in preparation for the recoating of the filter leaves with the precoat, valves A7, B7 and C7 allowing trapped air to escape during fill.

Referring to FIG. 1, flow control and pressure switches F and P are located in the prefilt and fill conduits 48 and 134, respectively. These switches have the purpose of automatically initiating certain stages of the regeneration cycle. Flow control switch F in the prefilt conduit 48 senses the need to commence regeneration. As the cells A, B and C becomes contaminated, the pressure drop and flow rate across the filter leaves increases and decreases, respectively. Once the flow rate reaches a predetermined minimum, switch F senses this condition and initiates the regeneration cycle. Pressure switch P in the fill conduit 134 senses when the tank of the cell which is being regenerated has been completely filled with fresh liquid prior to initiation of the precoat cycle, the pressure in conduit 134 rapidly increasing when this condition is reached. When this pressure increases to a predetermined magnitude, switch P is actuated to initiate the precoating phase of the regeneration cycle. Although a flow switch has been shown in prefilt conduit 48 and a pressure switch in conduit 134, it will be understood that either pressure or flow control switches may be utilized in these conduits.

Since the circulating pump 1M in the prefilt supply conduit 48 continuously operates, provision is made to insure that it is supplied with liquid at all times and, in particular, in the event that the dirty liquid tank 44 runs dry. To this end a clean liquid cross connect conduit 136 is provided between the clean liquid tank 22 and dirty liquid tank 44 to introduce clean liquid to the prefilt conduit 48 as needed. A normally closed valve 138 is opened at a suitable low level sensor, for example a low level float 140, in the dirty liquid tank 44 when the liquid level in tank 44 drops to a predetermined minimum level.

Referring to FIGS. 7–14, a preferred schematic electrical control circuit is shown for controlling automatically the filtration and regeneration cycles of the filter cells. The circuit shown in FIGS. 7–14 is a single circuit and has been separated in the drawings only due to lack adequate space upon any one sheet of drawings to depict the entire circuit on a single given sheet. The operation and components of the circuit diagram should be clear to one skilled in the art, since the circuit diagrams are conventional relay circuits and employ conventional relay circuit nomenclature. Thus, the diagram will not be explained in full detail, except to call attention to some of the important components, operating functions and circuit nomenclature as they relate to the present invention.

In FIGS. 7–14, the numerals, either by themselves or as circled or surrounded by a square, designate pin terminal connections and do not relate to the reference numerals previously described. In addition, the encircled numerals designate pin terminal connections which are connected to remote pushbutton stations. The numerals and letters, however, which appear in bold face do correspond to reference numerals and letters appearing in FIGS. 1–6, 15 and 16. The numerals appearing to the left in FIGS. 7–14 simply denote reference line numbers.

The numerals appearing to the right in FIGS. 7–14 denote the normal condition of the switches mechanically coupled to and operated by the relay coil appearing in that line. For example, referring to FIG. 7, line 8, the numerals 8, 9, 10, 11 denote that the switches CR 30 operated by coil CR30 in line 8 are to be found in lines 8, 9, 10 and 11 and that the normal condition of these switches when the coil CR30 is deenergized is that the switch CR30 in reference line 8 is open and the switches CR30 in reference lines 9, 10 and 11 are closed.

Referring to FIGS. 7–14 it will be seen that the control circuit employs a stop switch which is stepped through various levels to sequentially initiate and control the various valves, motors and the like through the cycles of the regeneration cycle. Stepping of the step switch is accomplished by the "step switch coil" shown in FIG. 8, line 18½ which is mechanically attached through a ratchet mechanism to the step switch. Each level of the step switch includes a plurality of channels, for example channels 1–15 shown in FIG. 8 at level No. 1 on the step switch. All 15 channels are not necessarily used in a given system, but are shown simply for the purpose of illustrating that the control circuit shown in FIGS. 7–14 may be readily employed in systems having more than three filter cells, additional channels being utilized where more than three filter cells are provided. In all instances and without regard to which level the step switch is positioned in at a given time, if a given channel is energized at any level, all channels of the same number at the other levels are also energized simultaneously. For example referring to FIG. 8, if channel 2 at reference line 19 is energized when the step switch is on level No. 1, channel 2 in each of the remaining level Nos. 2–7 are also energized.

Figure 13:
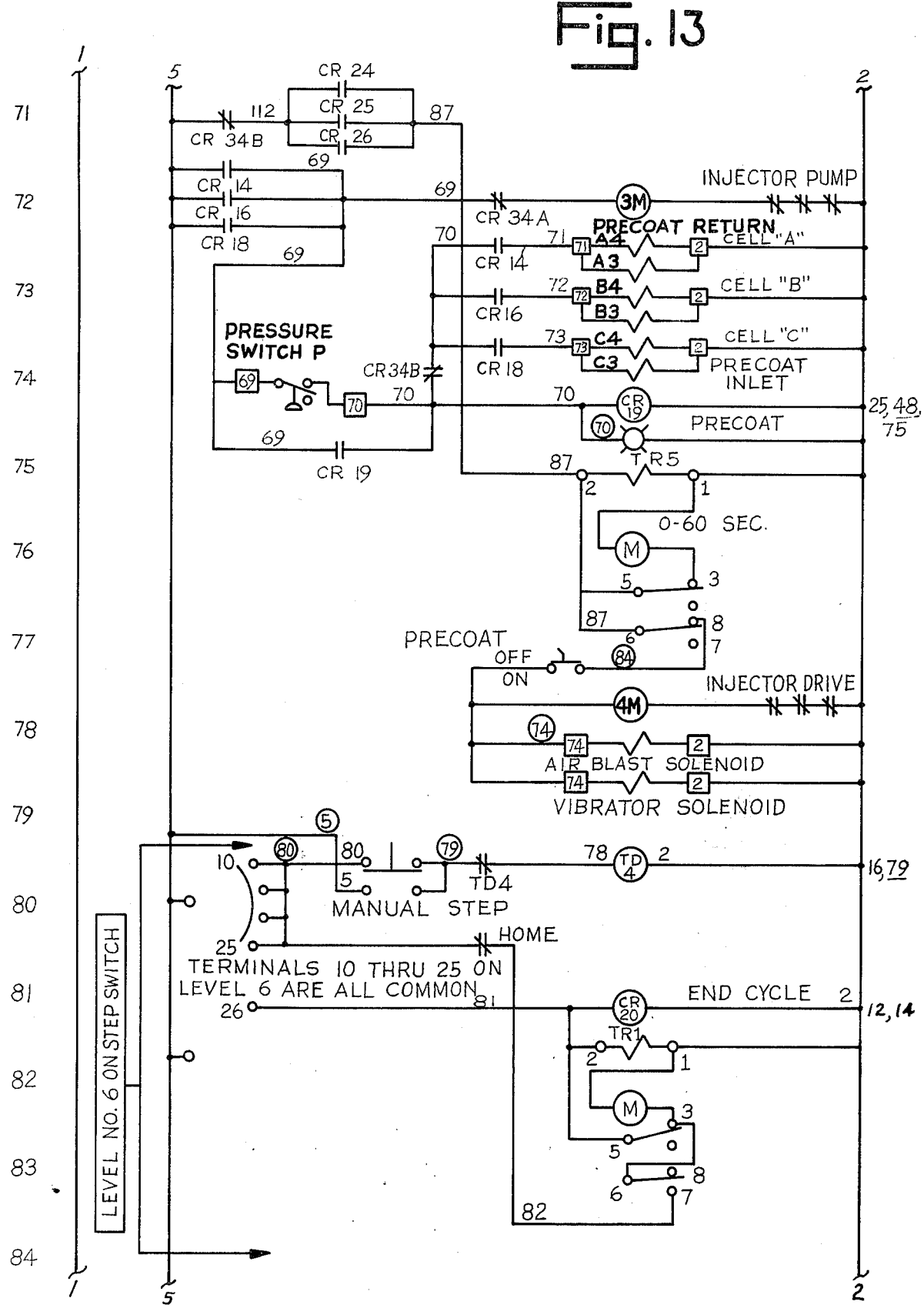
Figure 14:
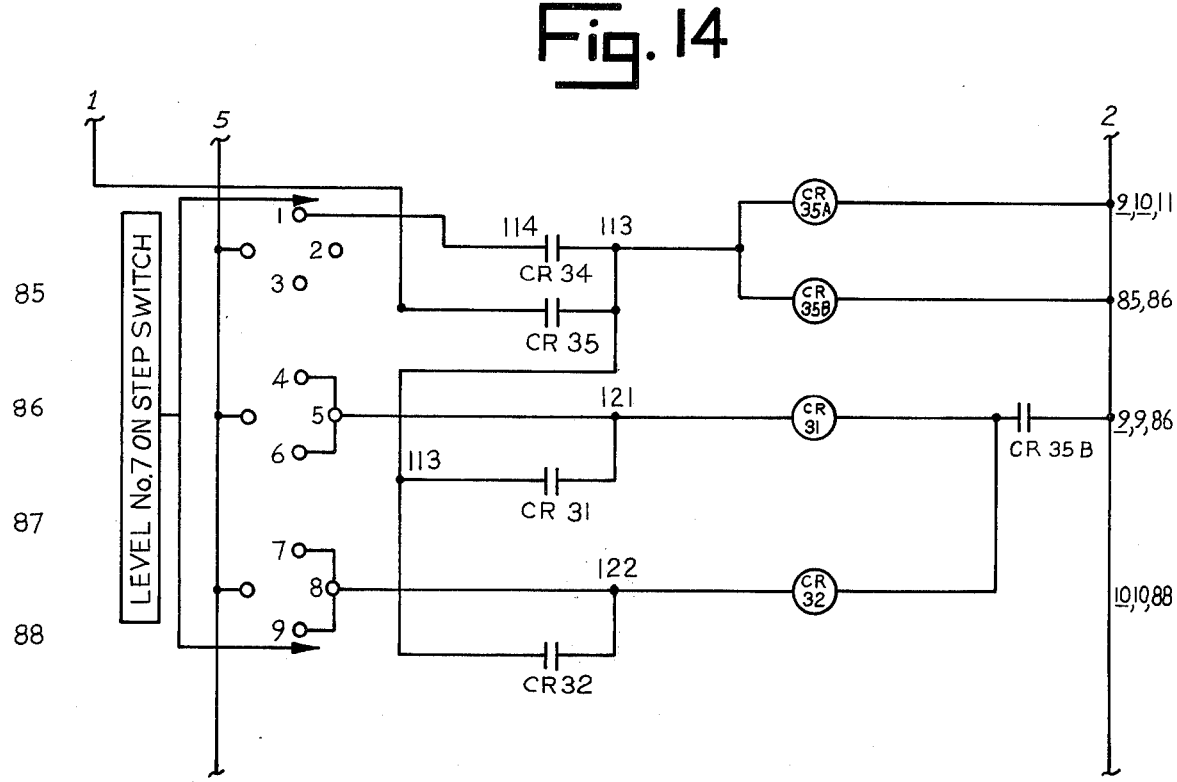

Referring to FIG. 13, when all of the filter cells have been regenerated, the step switch is returned to the "home" position shown in reference line 80½ and normal parallel filtration proceeds with respect to all of the cells A, B and C. It is when the step switch is moved from the "home" position that regeneration commences.

The control circuit is preferably lower voltage, e.g. 120 volts, 60 cycle, a.c. The motor operating coils, e.g. coil 1M in FIG. 7, line 3, in turn operate relay control switches of like number in a preferably higher voltage, e.g. 240 volt, circuit of the respective motors, the latter being shown in FIG. 15. For example, energization of coil 1M in FIG. 7, line 3 will close its switch 1M in FIG. 15 to energize the circulating pump motor 1M shown in FIG. 15.

OPERATION

The detailed operation of the system and method of the present invention will now be described.

Figure 15:
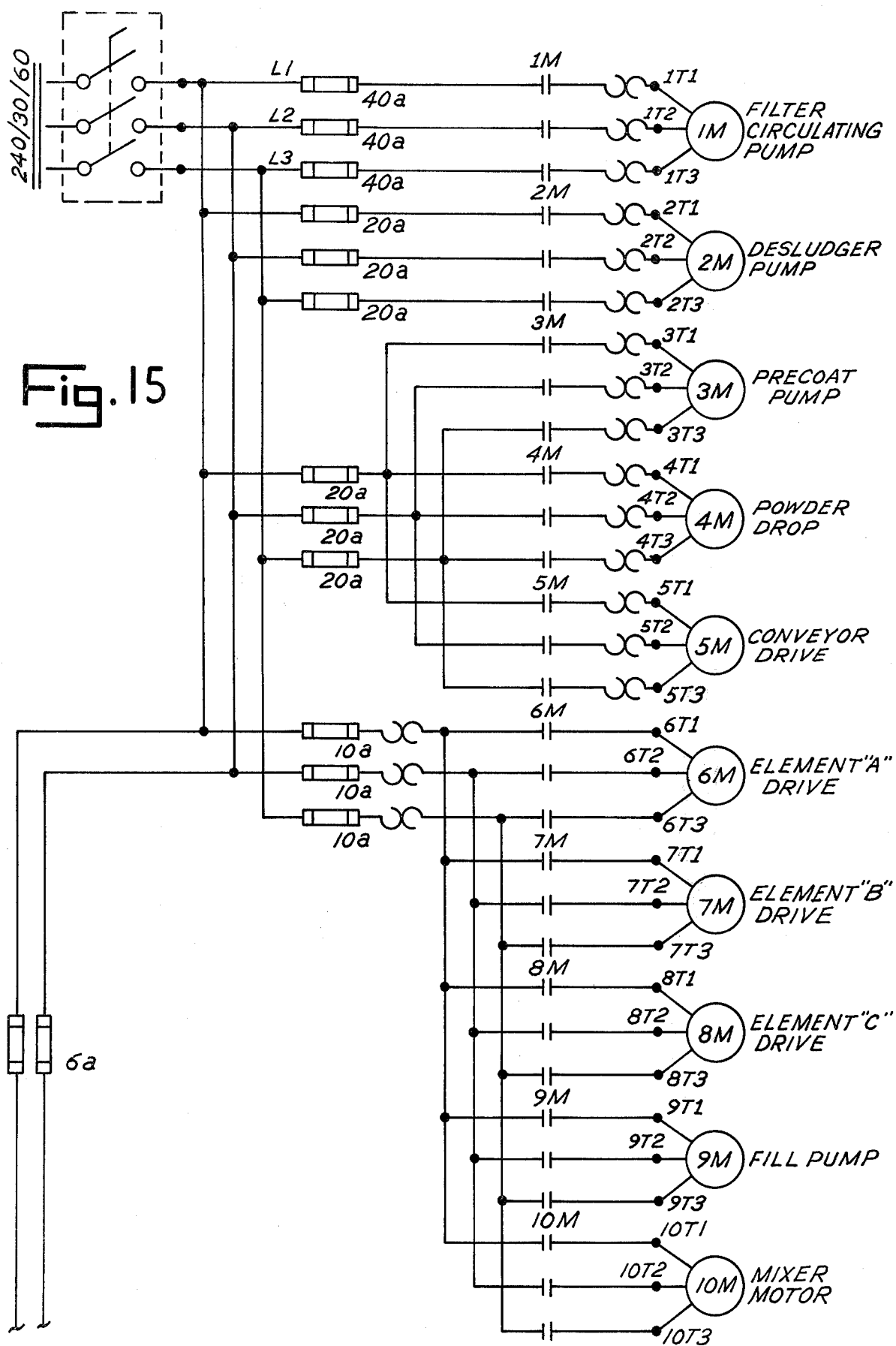
FIG. 15 is an electrical circuit diagram showing the various operating motors of the system of the present invention which are controlled by the circuit shown in FIGS. 7–14.

It will be assumed that the "start up" cycle shown in FIG. 15 has been completed and that filtration is underway in the cells A, B and C. This does not mean that the cleaning wheel 10 need be shutdown, since the cleaning wheel operates independently without regard to whether filtration or regeneration is occurring. During a shutdown period, the contaminated liquid from the cleaning wheel may be periodically discharged through conduit 14, valve 16 and dump conduit 18 to the desludger tank 20 and screen 28 and clean liquid is resupplied to the cleaning wheel from the clean liquid storage tank 22 through conduit 24 and valve 26. Of course, during filtration all of the filter assemblies 56 of cells A, B and C are coated with a layer of precoat or filter aid and the cell tanks 52 are filled with liquid.

During filtration, the circulating pump 1M is energized and solenoid valves A1, B1, C1 in the prefilt inlet conduits 48A, 48B and 48C are open to introduce prefilt from the dirty liquid tank 44 and the prefilt supply conduit 48 into the tanks 52 through manifolds 50 in the respective cells. Valves A6, B6 and C6 in the filtrate discharge conduits 88A, 88B and 88C are also open to conduct filtrate from each of the cells through filtrate return conduit 88 back to the clean liquid tank 22. If the liquid level in the desludger tank 20 exceeds the level of float switch 46, the desludger pump 2M also is energized to pump dirty liquid which collects in the desludger from dump conduit 18 from the bottom of the desludger tank through conduit 42 to the dirty liquid tank 44. During periods of filter system shutdown, pump 2M is preferably also shutdown to prevent the dirty liquid tank 44 from overflowing.

During filtration, dirty liquid will be drawn from the dirty liquid tank 44 through pump 1M and prefilt supply conduit 48, and will flow through valves A1, B1 and C1 and prefilt conduits 48A, 48B and 48C to the inlet manifolds 50 in cells A, B and C. This prefilt, which is under pressure due to pump 1M, circulates in the tanks 52 and passes through the layer of precoat 102 on the respective filter leaves as shown in FIG. 5, and through the foraminous support assembly 94, the apertures 96 in the filtrate collecting manifold 68, and through thhe filtrate manifold. The clean liquid is discharged from the filtrate manifold 68 through the short conduit 82 to the filtrate discharge conduits 88A, 88B and 88C, open valves A6, B6 and C6, through the filtrate return conduit 88 to the clean liquid tank 22 where it is stored until needed in the cleaning wheel 10.

If for some reason there is not sufficient dirty liquid in the dirty liquid tank 44 to keep the pump 1M supplied, this pump continuously running, the low level float 140, as shown in FIG. 7, line 7, opens valve 138 in the cross connect conduit 136 to send some clean liquid to the dirty liquid tank 44 or to conduit 38 as shown in FIG. 1 to satisfy the pump.

Figure 8:
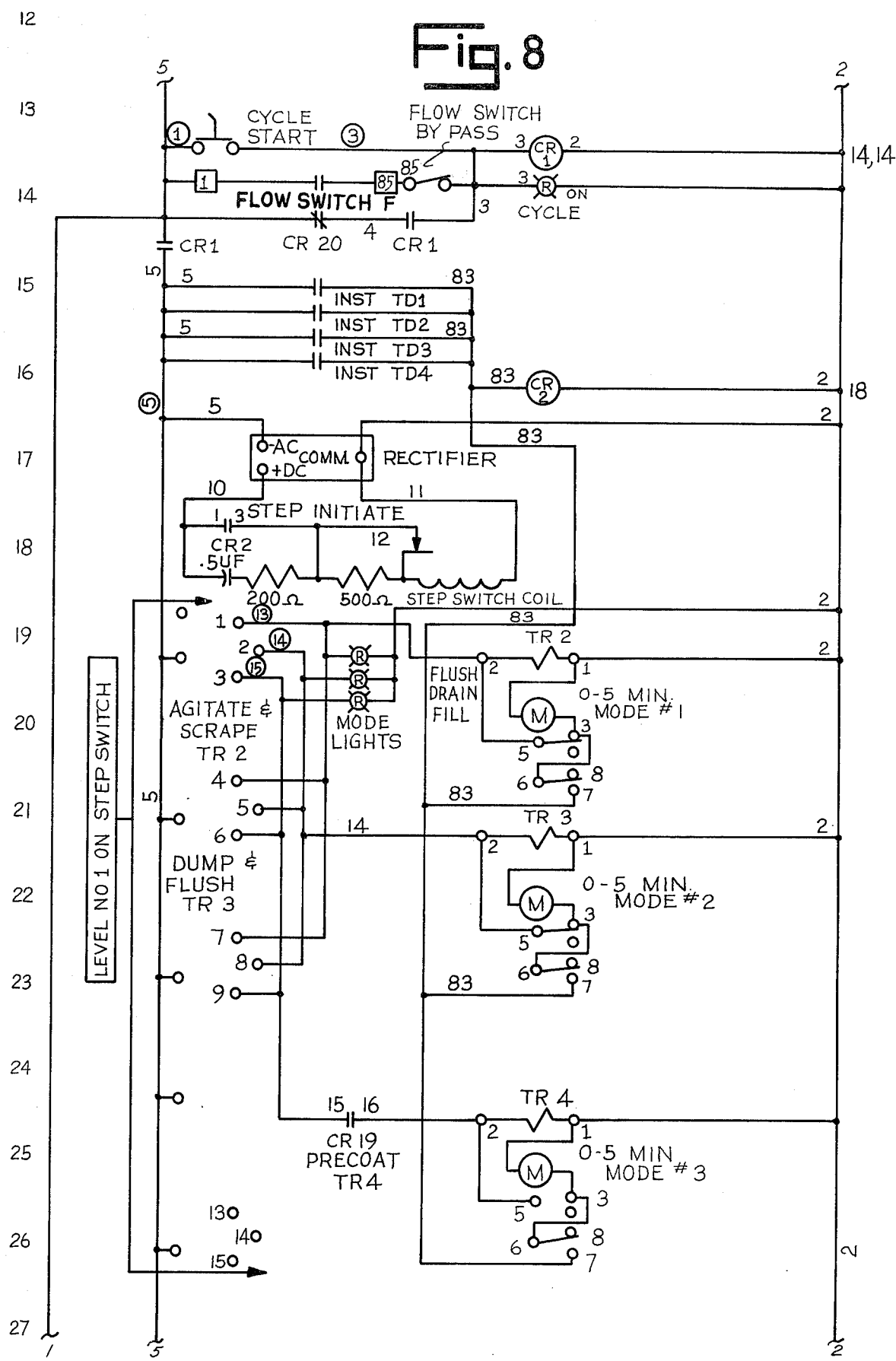

In the operation thus far described, cells A, B and C are filtering in parallel to each other. As this parallel filtration continues in the cells A, B and C, contaminants will continue to collect on the filter leaves 58 of the three cells. As these contaminants build up, the pressure drop across the filter leaves 58 will steadily increase and the pressure in the prefilt supply conduit 48 will likewise increase and the flow rate will decrease. When the flow rate has reached a predetermined minimum due to the build up of contaminants on the filter leaves, the flow switch F in the prefilt supply conduit 48, as shown in FIG. 1 and FIG. 8, reference line 14, will signal the control circuit to commence a recycling, regeneration of the cells one-by-one. Regeneration is commenced by stepping the step switch from the "home" position shown in FIG. 13, reference line 80½ to level No. 1 of the step switch as shown in FIG. 8.

Upon initiation of regeneration, cell A will first be regenerated. Particular reference is made to FIG. 16 in which the energization-deenergization/open-closed condition of the various motors and valves are shown during the successive stages of regeneration of each of the cells. In particular, the "recycle" portion of FIG. 16 should be considered in the description to follow of this regeneration, "recycle" and "regeneration" being synonymous.

When the step switch is stepped from the "home" position to level No. 1, flushing of cell A commences and the conveyor drive 5M is energized to drive conveyor screen 28 in the desludger tank 20 in a clockwise direction as shown in FIGS. 1 and 2. Also the powder drop number 4M and mixer motor 10M are energized at this time to drop a predetermined amount of precoat powder into the precoat tank 118 to commence preparation of the slurry that will be needed to precoat cell A when it is time to precoat these filter leaves. Simultaneously with these steps, dump valve A5 is opened, the filtrate discharge valve A6 is closed and air solenoid valve A8 is opened. The closing of the filtrate discharge valve A6 causes the pressure to immediately increase on the normally low pressure discharge side of the filter leaves. The opening of dump valve A5 immediately reduces the pressure in tank 52 on the prefilt side of the filter leaves from the maximum pressure just prior to initiation of regeneration to essentially atmospheric pressure, since valve A7 also opens as soon as its relatively small chamber begins to drain back to tank 52. In addition, the opening of air valve A8 causes a small metered amount of air to be introduced to the filtrate discharge conduit 88A between the low pressure filtrate side of the filter leaves and closed valve A6 to speed up the equalization of any pressure differential which may have existed across the filter at the time regeneration is initiated. This rapid dissipation of pressure differential is important, since it has been found that equalization of the pressure across the filter immediately upon commencement of regeneration prevents the embedding of precoat particles in the extremely fine mesh foraminous support assembly 94 and substantially increases the life of the filters. Since pressure differential equalization occurs immediately, a time lapse is not necessary between the end of the filtration and commencing cleaning of the filter leaves, thereby reducing the down time of the cell being regenerated and the need for elaborate time delay control circuitry. Moreover, in an oil filtration system, the air introduced through valve A8 cause an initial slight positive pressure to develop on the filtrate side of the caked precoat to assist in rupturing of this caked mass which appreciably aids in the subsequent flushing and brushing of the contaminated precoat cake from the filter leaves.

Prefilt valve A1 remains open at this time. Thereby, prefilt will continue to flow into cell A through manifolds 50 and will circulate in the spiral pattern shown in FIG. 6 now that flow no longer occurs to the filter leaves. This spirally flowing liquid will then exit the tank 52 through dump valve A5. This circulating prefilt liquid impinges the filter leaves and flows between them to flush the contaminants and dirty precoat from the filter leaves, suspends these solids in the tank and disposes of these contaminants through the dump valve 52S. As this dirty liquid leaves valve 52S, it is dumped upon the moving conveyor screen 28 in the desludger tank 20. The solids which are dumped are, in major part, retained upon the screen 28 and as the screen rotates up and out of the desludger tank, the solids are dumped in the trash container 40 as shown in FIG. 1. The liquid which passes through the screen is collected in the sump 34 and is returned to the dirty liquid tank 44 when the liquid level in the sump rises to the level L to actuate the desludger pump 2M by way of float control 46 shown in FIG. 1 and FIG. 7, line 5½.

Since flow continues uninterrupted through valve A1 in both the filtration and flushing stages, and also since the manifolds 50 are located in the bottom of the tank A, any settling out of either the contaminants or the precoat particles is positively avoided.

Figure 10:
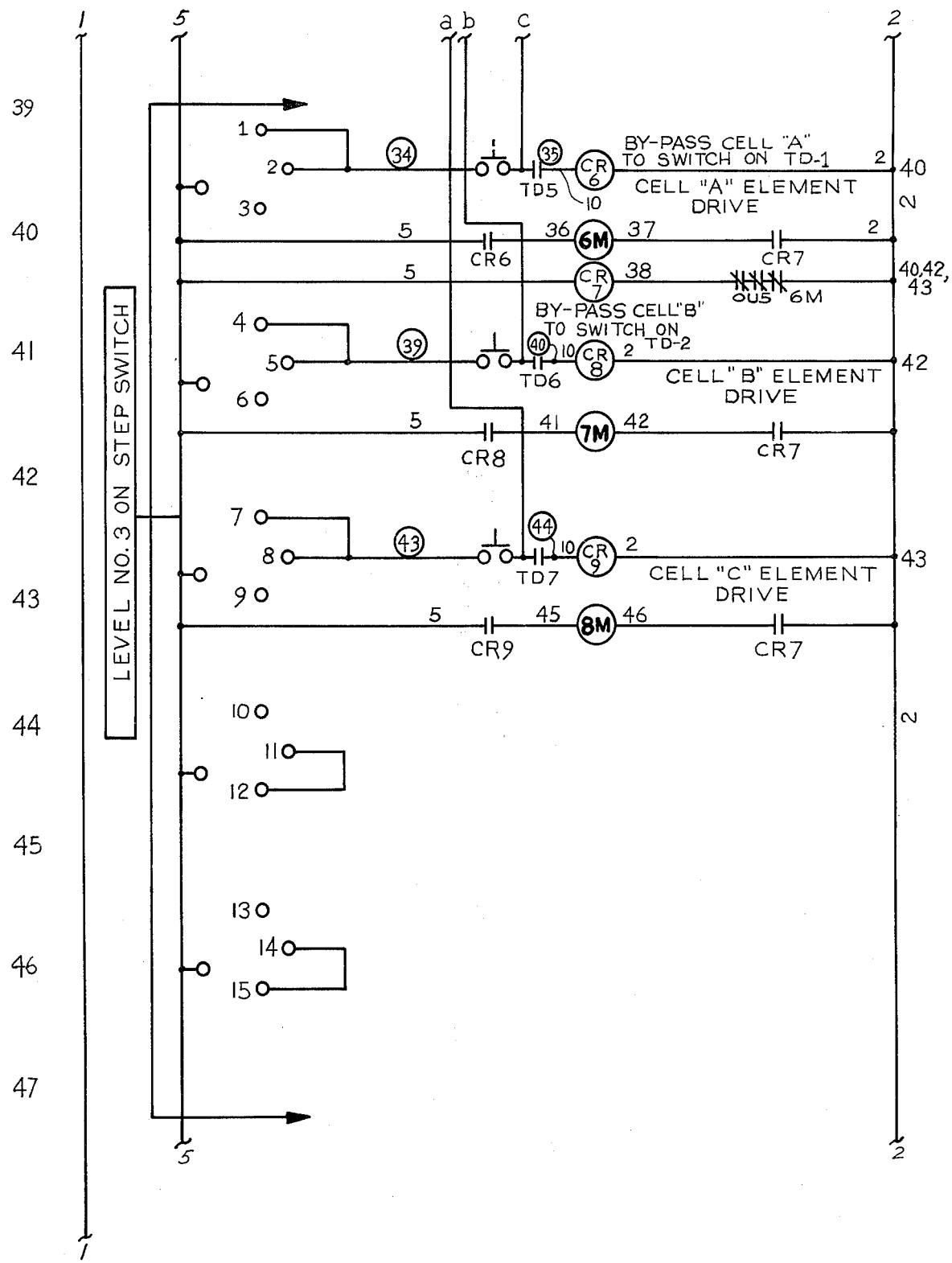
Figure 11:
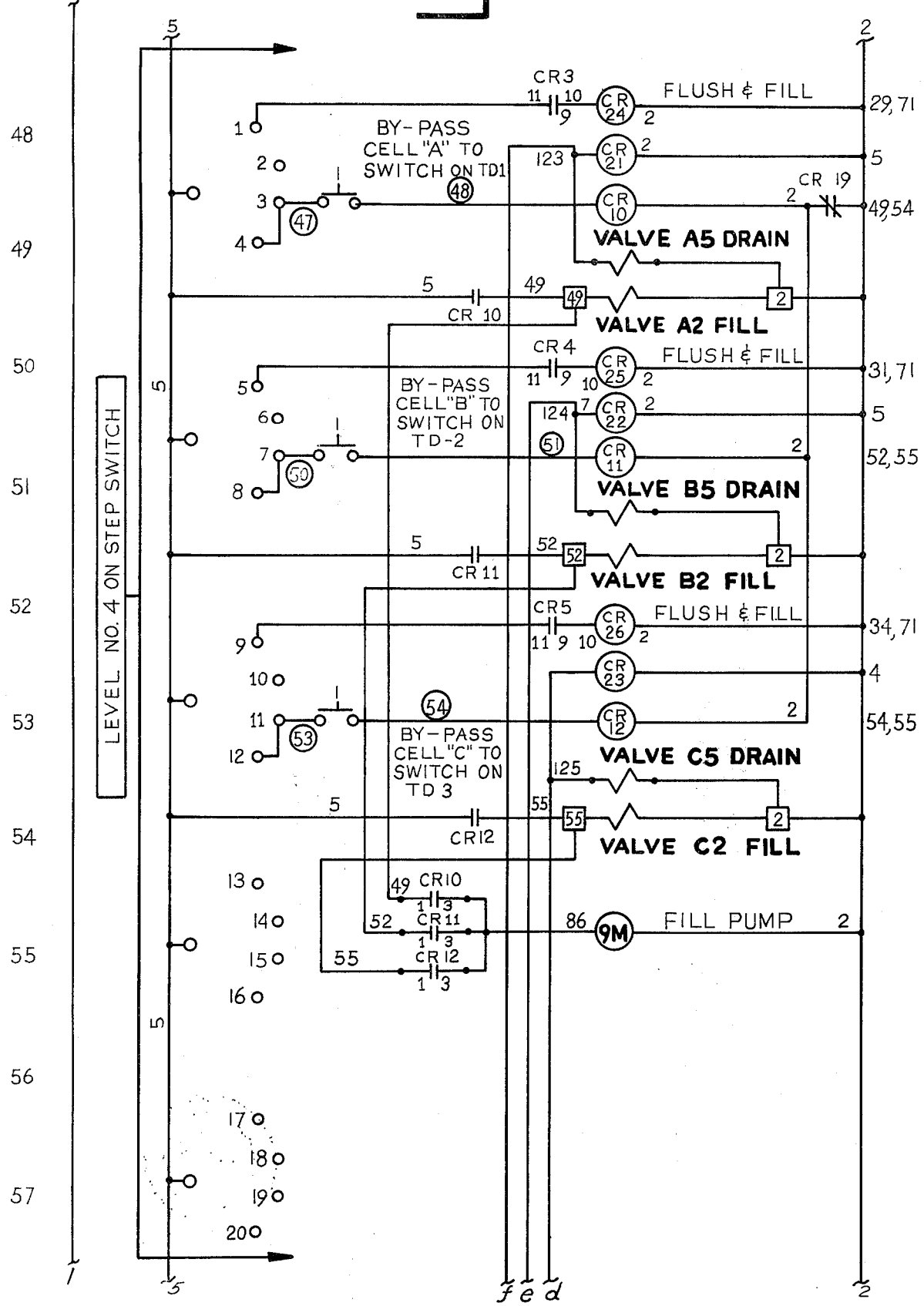
Figure 12:
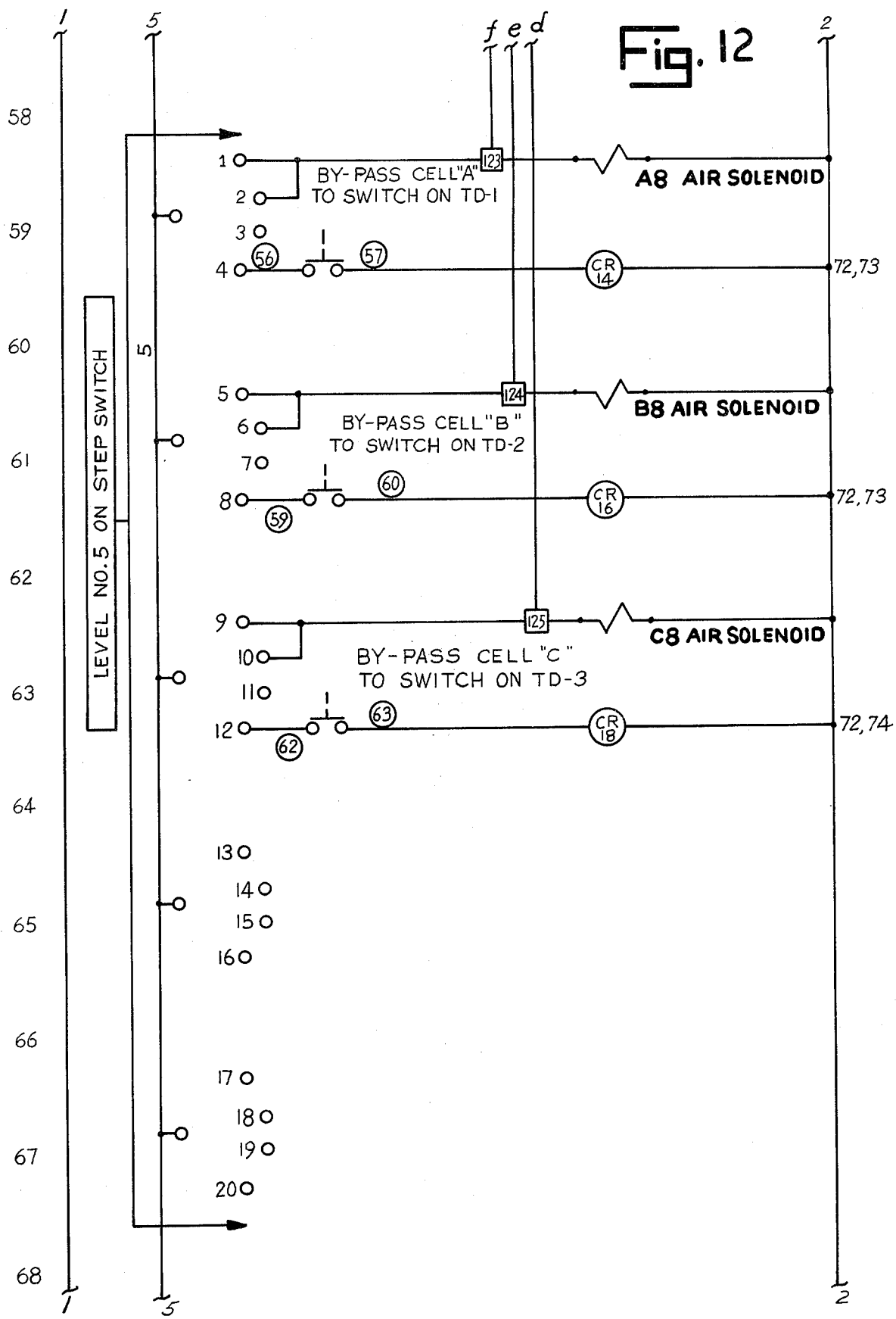

After a predetermined time delay of about 5 seconds by the time delay switch TD5 in FIG. 10, reference line 39½, the element drive motor (6M is energized to rotate the filter leaves of cell A in the clockwise direction as viewed in FIG. 4 while flushing continues. The brushes 108 will be held stationary due to engagement with the overhead brush stop 110 shown in FIG. 4 and as the leaves 58 continue to rotate, the dirty precoat layers 102 will be mechanically cleaned from the underlying foraminous support assembly 94 and will be flushed out by the continuing inflow of prefilt liquid.

Figure 9:
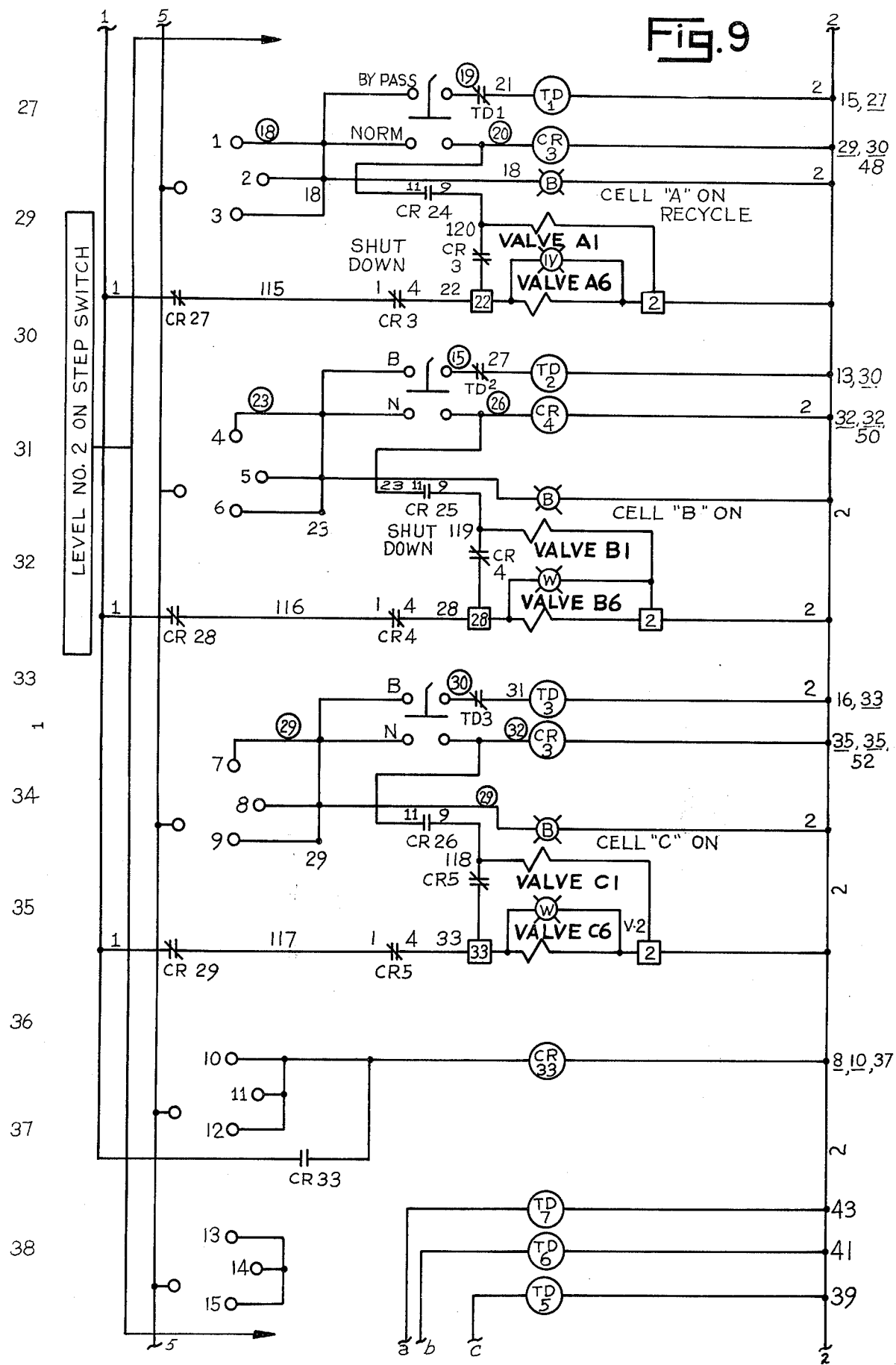

After a predetermined amount of time, as set on the timer in FIG. 8, reference line 20, the step switch will be stepped to level No. 2 shown in FIG. 9. Normally the flushing cycle will be set to end after 3 minutes. This cycle can be shortened, however, by pressing the manual step switch FIG. 13, line 80 to step the step switch to the next level.

Stepping the step switch to level No. 2 completes the flush cycle and initiates the cell A drain cycle. Upon initiation of the drain cycle, the conveyor screen motor 5M continues to run as does the element drive motor 6M. In addition, the dump valve A5 remains open as does the air valve A8, the latter preventing a vacuum build up during draining along with the open vent A7. However, the prefilt supply valve A1 now closes and flushing of the filter elements ceases. Once the tank 52 of cell A has been completely drained through dump valve A5, the drain cycle will be completed and the next cycle, the fill cycle, is commenced.

To commence the fill cycle, the step switch is stepped to level No. 3, FIG. 10. This stepping to the fill cycle may be instituted in response to a liquid level indicator in the housing of cell A which senses when the tank 52 has emptied or after a predetermined period of time by a timer.

Upon commencement of the fill cycle, the conveyor screen drive motor 5M and the element drive motor 6M are deenergized and the dump valve A5 and air valve A8 are shut. Fill pump 9M is simultaneously energized to pump clean liquid from the clean liquid tank 22 through the fill conduit 134 and valve A2 is opened to allow clean liquid to enter the tank of cell A through the prefilt inlet conduit 48A and the manifold 50 to fill the tank of cell A with clean liquid. Automatic vent valve A7 opens to allow trapped air to escape from the tank 52. Once the housing has been filled, the pressure will rapidly increase in tank 52 and the fill conduit, since valve A7 will automatically shut, and this pressure increase will be sensed by pressure switch P shown in FIG. 1 and FIG. 13, reference line 74, to complete the fill cycle and commence the precoat cycle. Upon completion of the fill cycle, the fill valve A2 is shut and pump 9M is deenergized.

Upon initiation of the precoat cycle, the step which will remain in level No. 3 shown in FIG. 10, but another channel will be placed into operation by the actuation of pressure switch P. The precoat pump 3M will be energized and the precoat supply valve A3 and precoat return valve A4 are opened. During the preceding cycles, the precoat slurry has been prepared in the precoat tank 118 and this slurry is now pumped by pump 3M through the precoat supply line 130, valve A3, the prefilt inlet conduit 48A and the manifold 50 into the cell tank which has been filled with clean liquid during the preceding fill cycle. This slurry will then pass through the foraminous support assembly 94 and the particulate precoat material will be retained upon the prefilt side of the support mesh discs 92 while the liquid will flow into the filtrate collection manifold 68 through apertures 96 and be discharged back to the precoat tank for use in mixing up the next batch through valve A4 and the precoat return conduit 132. The flow of precoat slurry continues for a sufficient time to coat the filter leaves with a fresh layer of precoat 102 of desired depth. Usually 4 minutes is sufficient to complete this coating operation and this time may be controlled by the timer in FIG. 8, line 25.

When the precoat cycle is completed, the precoat pump 3M is deenergized and valves A3 and A4 are shut. At this time, the step switch is stepped to level No. 4 in FIG. 11 to place cell A back on the filter cycle and to commence the flushing cycle of cell B. To place cell A back on the filter cycle, the prefilt supply valve A1 and filtrate discharge valve A6 are opened. Thus, dirty liquid will now again be pumped from the dirty liquid tank 44 by the circulating pump 1M, through the prefilt supply conduit 48, valve A1, prefilt inlet conduit 48A, manifolds 50, through the precoat layers 102, the foraminous support assembly 94, apertures 96, and the filtrate collection manifold 68, through the short conduit 82, the filtrate discharge conduit 88A, valve A6, and the filtrate return conduit 88 to the clean liquid storage tank 22.

The aforementioned sequence of regeneration steps is then repeated with respect to cell B and then cell C. It will be understood that during the regeneration of cell A, filtration continues in cells B and C, during the regeneration of cell B, filtration continues in the just cleaned cell A and in the yet to be cleaned cell C, and during the regeneration of cell C, filtration continues in the clean cells A and B. Thus, the system and method of the present invention functions in a continuous manner, as opposed to batch, due to the parallel relationship of the cells. Moreover, the filter system of the present invention need not be put completely out of commission in the event that repairs need be performed on one of the cells. In addition, the aforementioned filter and regeneration system and method are automated in operation and require a minimum of maintenance and personnel attendance.

Figure 16:
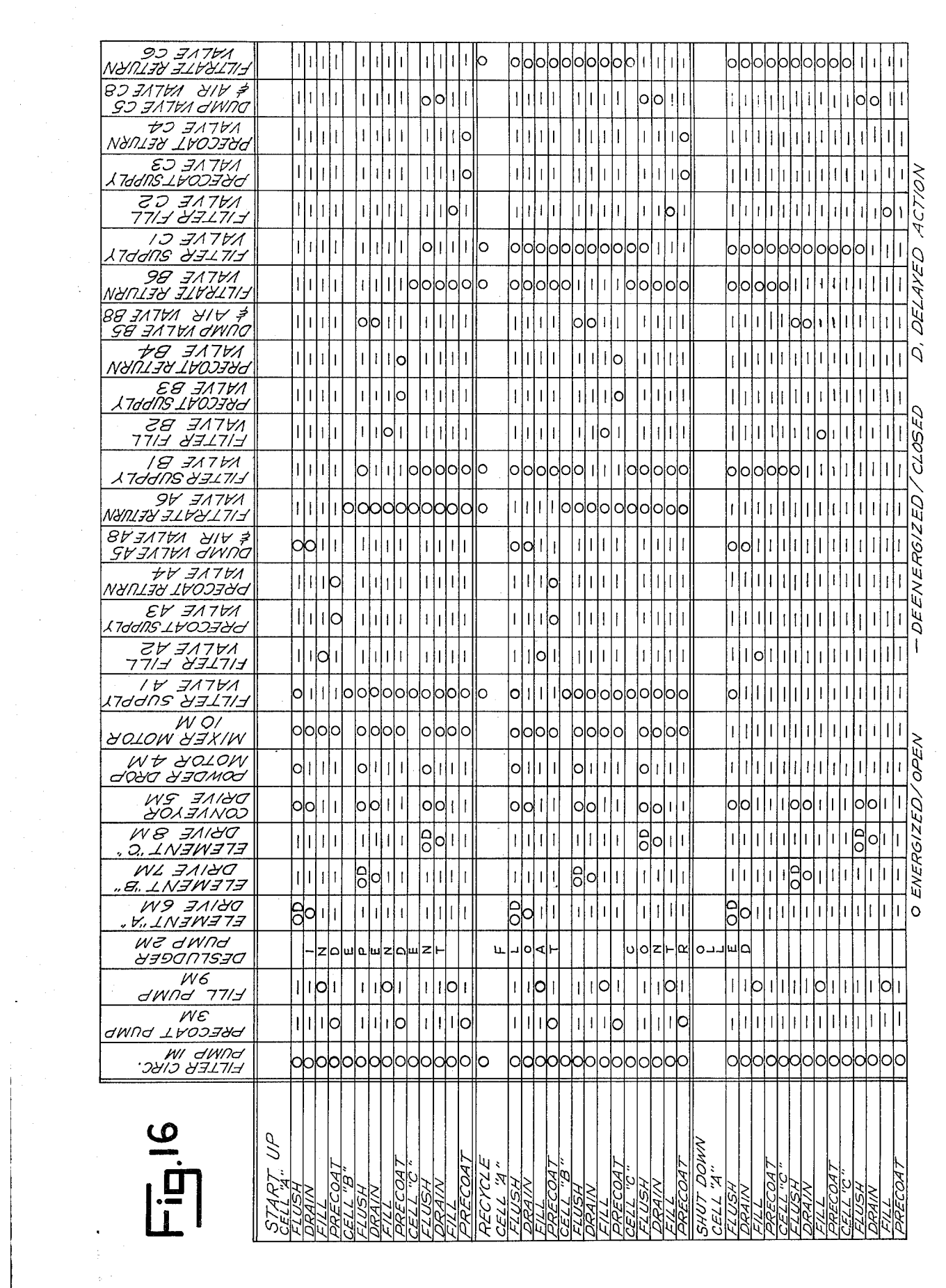

Referring to FIG. 16, the operation in "recycle" has been described and, in particular, with respect to the "recycle" of cell A. In FIG. 16, the sequence of operation and the energization-deenergization/open-closed state of the motors and valves are also shown for "startup" and "shutdown." These "startup" and "shutdown" sequences will not be described in detail, since these operations should be clear in view of the preceding description and FIG. 16. During "startup" and "shutdown," one cell at a time will be brought on line or taken off line, rather than the continuous parallel operation which takes place during regeneration. This, of course, is necessary, since during start up, for example, none of the cells have been precoated and to place these uncoated cells "on stream" would result in contaminated liquid being pumped to the clean liquid tank 22. Thus, relay coil CR 27, 28 and 29 shown in FIG. 7, lines 9–10 are provided to start up one cell at a time while the other yet to be prepared cells await preparation. The converse is also true during shutdown where one cell at a time is taken "off stream" and cleaned and that cell is then left "off stream" while the next cell is taken "off stream," relay coils CR 27, 28 and 29 also performing this operation.

It should be understood that although the system and method of the present invention have been described in terms of a filtering and regeneration system for use with an article cleaning system, that the principles of the present invention may well find use in other systems other than article cleaning systems. For example, the filter system of the invention may be utilized in the purification of industrial, commercial or municipal effluents prior to discharge into treatment systems or waterways.

The preferred embodiment of invention herein described is a fully recycled system in which all of liquid is recycled. Thereby, in such system, the clean liquid tank 22 is of a size to contain a substantial volume of system liquid. If the system and method is to be employed in a waste treatment system in which recycling is not contemplated, the clean liquid tank 22 need only be sufficiently large to store a sufficient amount of clean liquid for the precoat and fill cycles of the cells.

Finally, it will also be understood that the embodiment of the present invention which has been described is merely illustrative of one of the applications of the principles of the invention. Numerous modifications may be made by those skilled in the art without departing from the true spirit and scope of the invention.

What is claimed is:

1. A method of regenerating filter means, said method comprising:
   simultaneously closing the filtrate discharge from said filter means and dumping the prefilt surrounding said filter means to reduce the pressure of prefilt surrounding said filter means,
   directing a flushing fluid against the prefilt side of said filter means while dumping said prefilt, and
   introducing a fluid at the filtrate side of said filter means to slightly, but rapidly, increase the pressure on the filtrate side of said filter means upon commencement of directing said flushing fluid against said prefilt side of said filter means.

2. The method of claim 1 wherein the step of directing the flushing fluid against the prefilt side of said filter means commences simultaneously with the commencement of dumping the prefilt.

3. The method of claim 1 wherein said fluid introduced to the filtrate side of said filter means is a gas.

4. The method of claim 1 wherein said filter means includes a particulate filter medium and foraminous support means upon which said particulate filter medium is deposited, and wherein said particlate filter medium is flushed from said filter means along with any contaminants thereon and dumped from said filter means.

5. The method of claim 4 including contacting the prefilt side of said filter means with mechanical cleaning means and moving said cleaning means and prefilt side of said filter means relative to each other while directing said flushing fluid against said prefilt side of said filter means.

6. The method of claim 4 including the steps of
completing the dumping of fluid from the prefilt side of said filter means after said particulate filter medium has been removed from said foraminuous support means,
flooding of the prefilt side of said filter means and said foraminuous support means with substantially clean fluid, and
introducing clean particulate filter medium to the fluid which floods the prefilt side of said foraminuous support means while simultaneously opening the filtrate discharge from said filter means whereby the clean particulate filter medium is deposited upon the prefilt side of said foraminuous support means.

7. The method of claim 1 comprising a plurality of said filter means, and wherein each of said filter means is regenerated while the remaining filter means continue to filter the fluid.

8. The method of claim 1 wherein said flushing fluid comprises prefilt liquid, and the flow path of said prefilt liquid is changed to effect flushing of said filter means upon and by the closing of said filtrate discharge and the dumping of said prefilt surrounding said filter means.

9. The method of claim 1 wherein the step of directing the flushing fluid against the prefilt side of said filter means commences simultaneously with the commencement of dumping the prefilt, and introducing a gas at the filtrate side of said filter means to rapidly equalize the pressure across said filter means upon commencement of directing said flushing fluid against said prefilt side of said filter means,
wherein said filter means includes a particulate filter medium and foraminous support means upon which said particulate filter medium is deposited, and wherein said particulate filter medium is flushed from said filter means along with any contaminants thereon and dumped from said filter means,
contacting the prefilt side of said filter means with mechanical cleaning means and moving said cleaning means and prefilt side of said filter means relative to each other while directing said flushing fluid against said prefilt side of said filter means,
completing the dumping of fluid from the prefilt side of said filter means after said particulate filter medium has been removed from said foraminous support means,
flooding of the prefilt side of said filter means and said foraminous support means with substantially clean fluid, and
introducing clean particulate filter medium to the fluid which floods the prefilt side of said foraminous support means while simultaneously opening the filtrate discharge from said filter means whereby the clean particulate filter medium is deposited upon the prefilt side of said foraminous support means.

10. A fluid filter regeneration system including a fluid enclosure having filter means therein and prefilt inlet means and filtrate discharge means communicating with prefilt and filtrate sides of said filter means, flushing means for directing a flushing liquid against the prefilt side of said filter means, and dump means for discharging the fluid from the prefilt side of said filter means, wherein the improvement comprises in combination therewith;
valve means on said filtrate discharge means, said dump means and said flushing means,
means for introducing a fluid at the filtrate side of said filter means, and
control means controlling said valve means and said means for introducing a fluid such that said filtrate discharge means are closed and said dump means and flushing means are opened simultaneously to reduce the pressure of prefilt on the prefilt side of said filter means and actuating said means for introducing a fluid substantially simultaneously with said closing of said filtrate discharge means for slightly, but rapidly, increasing the pressure on the filtrate side of said filter means to rapidly equalize the pressure across said filter means.

11. The system of claim 10 wherein said flushing liquid comprises prefilt liquid, and the flow path of the prefilt liquid is changed to effect flushing of said filter means by the position of said dump means in said fluid enclosure.

12. The system of claim 10 wherein said prefilt inlet means comprises manifold means in the bottom of said enclosure having a plurality of apertures therein for directing the prefilt toward said filter means.

13. The system of claim 12 wherein said flushing means comprises said manifold means.

14. The system of claim 10 wherein said filter means comprises foraminous support means adapted to support a particulate filter medium coated thereon, particulate medium inlet means on said enclosure for introducing said particulate medium thereto, said control means closing said filtrate discharge means and opening said flushing means and dump means to flush the contaminated particulate filter medium from said foraminous support means and discharge the prefilt in said enclosure and said flushed medium from said enclosure, and then open said filtrate discharge means and particulate medium inlet means and close said dump means to recoat said foraminous support means with clean particulate filtering medium.

15. The system of claim 14 including enclosure fill means, said control means operating said enclosure fill means to fill said enclosure with fluid at said filter means is flushed, but before said particulate inlet means is opened.

16. The system of claim 14, wherein said prefilt inlet means comprises manifold means in the bottom of said enclosure having a plurality of apertures therein for directing the prefilt toward said filter means, and said flushing means, said enclosure fill means and said particulate inlet means also comprise said manifold means.

17. The system of claim 14 including mechanical cleaning means contacting the prefilt side of said filter means, and means to move the cleaning means and the filter means relative to each other to clean said filter means.

18. The system of claim 17 wherein said control means moves said cleaning means and filter means relative to each other while said flushing means is flushing said filter means.

19. The system of claim 17 wherein said filter means comprise a plurality of filter leaves spaced from each other, means mounting said leaves for rotation in said enclosure, and said cleaning means comprises stationary brush means positioned between said leaves.

20. The system of claim 14 including desludging means, said dump means discharging to said desludging means, said desludging means including separator means to separate the solids discharged thereto from the fluid and first and second discharge means for separately discharging said solids and fluids, respectively, from said desludging means.

21. The system of claim 20 wherein said separator means includes screen means positioned beneath said dump means for retaining said solids and sump means for collecting the fluid which passes through said screen means, drive means for moving said screen means to discharge the solids therefrom, said control means actuating said drive means when said dump means is discharging to said screen means.

22. The system of claim 21 wherein the solids and fluid are discharged from said dump means in spaced relation to and above said screen means.

23. The system of claim 21 including means to continuously maintain the level of the fluid in said sump means below the level of said screen means.

24. The system of claim 20 including conduit means communicating said desludger and filter enclosure with each other wherein the liquid discharged from said desludger is filtered by said filter means.

25. The system of claim 10 wherein said system comprises a plurality of said fluid enclosures and filter means, and wherein said control means causes each of said filter means to be successively regenerated while the remaining filter means continue to filter.

26. The system of claim 10 including an article cleaning means for fluid cleaning articles and means for transferring contaminated fluid from said article cleaning means to said system and filtered fluid from said system to said article cleaning means independently of the regeneration of said filter means.

27. A fluid filter regeneration system comprising;
a plurality of fluid enclosures each having filter means therein, said filter means comprising a plurality of foraminous support means for supporting a particulate filter medium on the prefilt side thereof,
a prefilt inlet conduit communicating a source of dirty fluid with each of said enclosures on the prefilt side of said foraminous support means, said prefilt inlet conduit having a first valve therein to control the flow of fluid to each said enclosure,
a filtrate discharge conduit communicating the filtrate side of said foraminous support means with clean fluid storage means, said filtrate discharge conduit having a second valve therein to control the flow of fluid from each of said enclosures,
means for introducing a fluid at the filtrate side of said filter means,
a fill conduit communicating the prefilt side of said foraminous support means with said clean fluid storage means, said fill conduit having a third valve to control the flow of fluid from said storage means to each of said enclosures,
desludging means,
dump means including a fourth valve on each enclosure for discharging fluid from said enclosures to said desludging means,
said desludging means including movable screen means for retaining and discharging solids from said desludging means and sump means for retaining fluid which passes through said screen means, said sump means comprising a source of said dirty fluid,
precoat means, comprising a precoat vessel for preparing a slurry of said particulate filter medium and conduit means, including fifth and sixth valves for controlling the flow of fluid respectively to and from each said enclosure, and
control means selectively operating said valves, said means for introducing a fluid, and said screen means to regenerate successively one of said filter means while the remaining filter means continue to filter said fluid by successively
 a. simultaneously closing said second valve, actuating said means for introducing a fluid for slightly, but rapidly, increasing the pressure on the filtrate side of said filter means, and opening said fourth valve while maintaining said first valve open of the filter means being regenerated to drain the enclosure of said filter means and flush contaminants and particulate filter media from the foraminous support means,
 b. closing said fourth valve, deactivating said means for introducing a fluid, and opening said third valve to fill said enclosure with clean fluid,
 c. closing said third valve and opening said fifth and sixth valves to recoat said foraminous support means with clean particulate filter medium, and
 d. closing said fifth and sixth valves and opening said first and second valves to resume filtration while commencing regeneration of another of said filter means.

28. The system of claim 27 wherein said control means includes sensing means for sensing at least one of the pressure or flow rate in said prefilt inlet conduit and to commence regeneration in response thereto.

29. The system of claim 27 including mechanical cleaning means engaging said filter means for cleaning said filter means and means to rotate said filter means, and wherein said control means energizes said means to rotate said filter means while said filter means are being flushed.

* * * * *